United States Patent
Shin et al.

(10) Patent No.: US 8,471,991 B2
(45) Date of Patent: Jun. 25, 2013

(54) ARRAY SUBSTRATE AND DISPLAY APPARATUS HAVING THE SAME

(75) Inventors: Cheol Shin, Hwaseong-si (KR); Hwa-Sung Woo, Suwon-si, KS (US); Kwang-Chul Jung, Seongnam-si (KR); Dong-Gyu Kim, Yongin-si (KR); Hyang-Yul Kim, Hwaseong-si, KS (US); Joo-Nyung Jang, Gyeongsan-si (KR); Dong-Chul Shin, Seoul (KR); Hee-Seop Kim, Hwaseong-si (KR)

(73) Assignee: Samsung Display Co., Ltd. (KR)

( * ) Notice: Subject to any disclaimer, the term of this patent is extended or adjusted under 35 U.S.C. 154(b) by 895 days.

(21) Appl. No.: 12/611,054

(22) Filed: Nov. 2, 2009

(65) Prior Publication Data

US 2010/0208184 A1    Aug. 19, 2010

(30) Foreign Application Priority Data

Feb. 13, 2009  (KR) .................. 10-2009-0012056

(51) Int. Cl.
*G02F 1/1343*  (2006.01)
*G02F 1/1368*  (2006.01)
*G02F 1/139*  (2006.01)

(52) U.S. Cl.
USPC .............. 349/141; 349/48; 349/145; 349/146

(58) Field of Classification Search
USPC . 349/37, 48, 139, 141, 145, 146, 144; 345/92
See application file for complete search history.

(56) References Cited

U.S. PATENT DOCUMENTS

| 2005/0078256 | A1* | 4/2005 | Hong | 349/141 |
| 2006/0139544 | A1* | 6/2006 | Ko et al. | 349/141 |
| 2006/0146248 | A1* | 7/2006 | Park | 349/141 |
| 2008/0246912 | A1* | 10/2008 | Inoue et al. | 349/182 |
| 2009/0066891 | A1* | 3/2009 | Woo et al. | 349/110 |
| 2010/0328591 | A1* | 12/2010 | Oh et al. | 349/114 |

FOREIGN PATENT DOCUMENTS

| JP | 2007034151 | 2/2007 |
| KR | 100288766 B1 | 2/2001 |
| KR | 1020070050740 A | 5/2007 |

* cited by examiner

*Primary Examiner* — Dung Nguyen
*Assistant Examiner* — Tai Duong
(74) *Attorney, Agent, or Firm* — Innovation Counsel LLP

(57) ABSTRACT

An array substrate includes first and second pixel electrodes. The first pixel electrode includes a plurality of first slit electrode portions and a first supporting electrode portion connected with the first slit electrode portions. The first slit electrode portions extend in a zigzag fashion along the shape of a unit pixel area and a first direction. The second pixel electrode includes a plurality of second slit electrode portions and a second supporting electrode portion connected with the second slit electrode portion. The second slit electrode portions extend in the zigzag fashion along the shape of the unit pixel area and the first direction. Side visibility and a response time may be improved, so that display quality may be improved.

18 Claims, 12 Drawing Sheets

ARRAY SUBSTRATE AND DISPLAY APPARATUS HAVING THE SAME

PRIORITY STATEMENT

This application claims priority under 35 U.S.C. §119 to Korean Patent Application No. 2009-12056, filed on Feb. 13, 2009 in the Korean Intellectual Property Office (KIPO), the contents of which are herein incorporated herein by reference in their entirety.

BACKGROUND OF THE INVENTION

1. Field of the Invention

The present invention relates to an array substrate and a display apparatus having the array substrate. More particularly, the present invention relates to an array substrate forming a horizontal electric field, and a display apparatus having the array substrate.

2. Description of the Related Art

Generally, liquid crystal display (LCD) apparatuses are the most widely used type of flat panel display apparatus. An LCD apparatus includes two display substrates having electrodes such as a pixel electrode and a common electrode for generating an electric field, and a liquid crystal layer disposed between the two display substrates. When a voltage is applied to the electrodes, the electric field is generated in the liquid crystal layer. The arrangement of liquid crystals is changed by the electric field, so that the transmittance and polarization state of incident light are controlled, to display an image.

Obtaining a wide viewing angle and a fast response time of the liquid crystal layer has been an important issue in LCD technology. In order to achieve these objectives, a multi-domain technique has been developed so that the liquid crystals in a unit pixel area having multi-domain structure are arranged in a multiple directions, and the shape of the electrode for generating the electric field has been improved.

However, the liquid crystals are still insufficiently controlled in a boundary area of the domain, so that textures are generated in the boundary area to decrease light transmittance and deteriorate display quality. In addition, when voltages having different levels such as low and high levels are applied to the liquid crystal layer to increase the number of the domains, an area ratio of low and high areas in the unit pixel area, which is an important factor in improving the display quality, may not be effectively controlled.

SUMMARY OF THE INVENTION

The present invention provides an array substrate capable of improving side visibility and response time.

The present invention also provides a display apparatus including the array substrate.

According to an example embodiment of the present invention, an array substrate includes first and second pixel electrodes. The first pixel electrode includes a plurality of first slit electrode portions and a first supporting electrode portion. The first slit electrode portions extend in a zigzag fashion along the shape of a unit pixel area in a first direction. The first supporting electrode portion is connected with the first slit electrode portions. The second pixel electrode includes a plurality of second slit electrode portions and a second supporting electrode portion, and forms a horizontal electric field with the first pixel electrode. The second slit electrode portions extend in the zigzag fashion along the shape of the unit pixel area in the first direction. Each of the second slit electrodes is disposed between adjacent first slit electrode portions. The second supporting electrode portion is connected with the second slit electrode portions.

In an example embodiment, the array substrate may further include a first data line, a second data line facing the first data line, a gate line, and first and second switching elements. The gate line is insulated from and crosses the first and second data lines. The first switching element electrically connects the first data line and the gate line with the first pixel electrode. The second switching element electrically connects the second data line and the gate line with the second pixel electrode.

According to an example embodiment of the present invention, a display apparatus includes an array substrate, a counter substrate facing the array substrate, and a liquid crystal layer. The liquid crystal layer is disposed between the array and counter substrates, and is vertically aligned with respect to the array and counter substrates in an electric field off-mode. The array substrate includes first and second pixel electrodes. The first pixel electrode is electrically connected with a first switching element, and includes a plurality of first slit electrode portions and a first supporting electrode portion. The first slit electrode portions extend in a zigzag fashion along the shape of a unit pixel area in a first direction. The first supporting electrode portion is connected with the first slit electrode portions. The second pixel electrode includes a plurality of second slit electrode portions and a second supporting electrode portion, and forms a horizontal electric field with the first pixel electrode. The second slit electrode portions extend in the zigzag fashion along the shape of the unit pixel area in the first direction. Each of the second slit electrodes is disposed between adjacent first slit electrode portions. The second supporting electrode portion is connected with the second slit electrode portions.

In an example embodiment, the display apparatus may further include lower and upper polarizing plates. The lower polarizing plate is disposed on a rear surface of the array substrate, and has a first polarization axis substantially parallel to or substantially perpendicular to the first direction. The upper polarizing plate is disposed on an upper surface of the counter substrate, and has a second polarization axis substantially perpendicular to the first polarization axis. The unit pixel area is divided into high and low areas which are alternatively disposed with each other. The first and second slit electrode portions are spaced apart from each other by a first gap to form the high area, and the first and second slit electrode portions are spaced apart from each other by a second gap wider than the first gap to form the low area.

According to the present invention, textures in the unit pixel area may be decreased, so that the transmittance and response time of a display apparatus may be improved. In addition, an area ratio of low and high areas may be easily changed as occasion demands, so that the side visibility of the display apparatus may be increased. Thus, the display quality of the display apparatus may be improved.

BRIEF DESCRIPTION OF THE DRAWINGS

The above and other features and advantages of the present disclosure of invention will become more apparent by describing in detailed example embodiments thereof with reference to the accompanying drawings, in which.

DETAILED DESCRIPTION OF THE INVENTION

Figure 1:
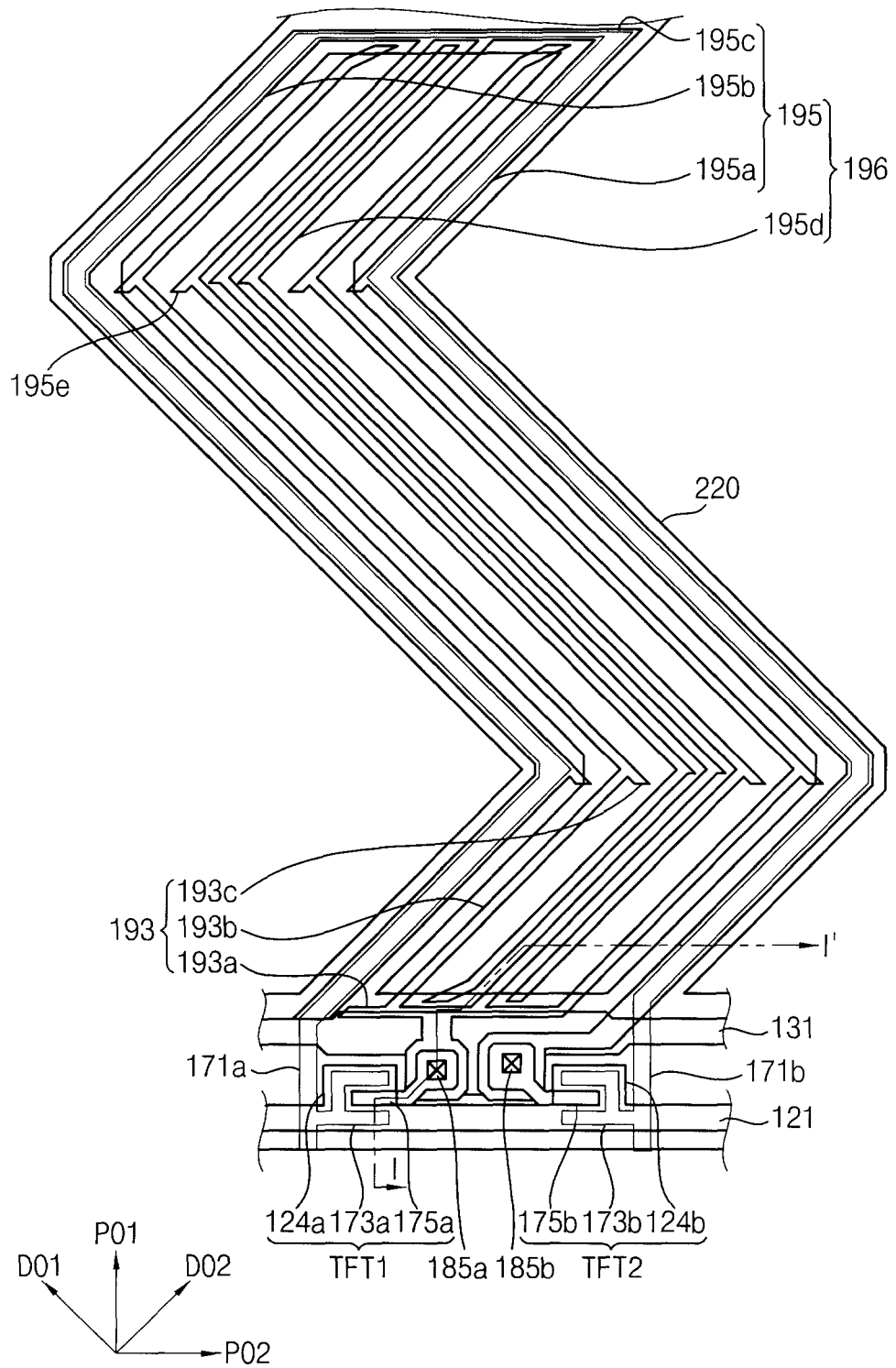
FIG. 1 is a plan view illustrating a pixel of a display apparatus according to an example embodiment of the present invention.

Although the present disclosure is described more fully hereinafter with reference to the accompanying drawings, the underlying concepts may, however, be embodied in many different forms and should not be construed as limited to the exemplary embodiments set forth herein. Rather, these exemplary embodiments are provided so that this disclosure will be thorough and complete, and will fully convey its teachings to those skilled in the pertinent art. In the drawings, the sizes and relative sizes of layers and regions may be exaggerated for sake of clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the apparatus in use or operation in addition to the orientation depicted in the figures. For example, if the apparatus in the figures is turned over, elements described as "below" or "beneath" other elements or features would then be oriented "above" the other elements or features. Thus, the exemplary term "below" can encompass both an orientation of above and below. The apparatus may be otherwise oriented (rotated 90 degrees or at other orientations) and the spatially relative descriptors used herein interpreted accordingly.

The terminology used herein is for the purpose of describing particular exemplary embodiments and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments are described herein with reference to cross-sectional illustrations that are schematic illustrations of idealized example embodiments (and intermediate structures) of the present invention. As such, variations from the shapes of the illustrations as a result, for example, of manufacturing techniques and/or tolerances, are to be expected. Thus, example embodiments herein should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of an apparatus and are not intended to limit the scope of the present invention.

Unless otherwise defined, all terms (including technical and scientific terms) used herein have the same meaning as commonly understood by one of ordinary skill in the pertinent art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present disclosure of invention will be explained in detail with reference to the accompanying drawings.

Figure 2:
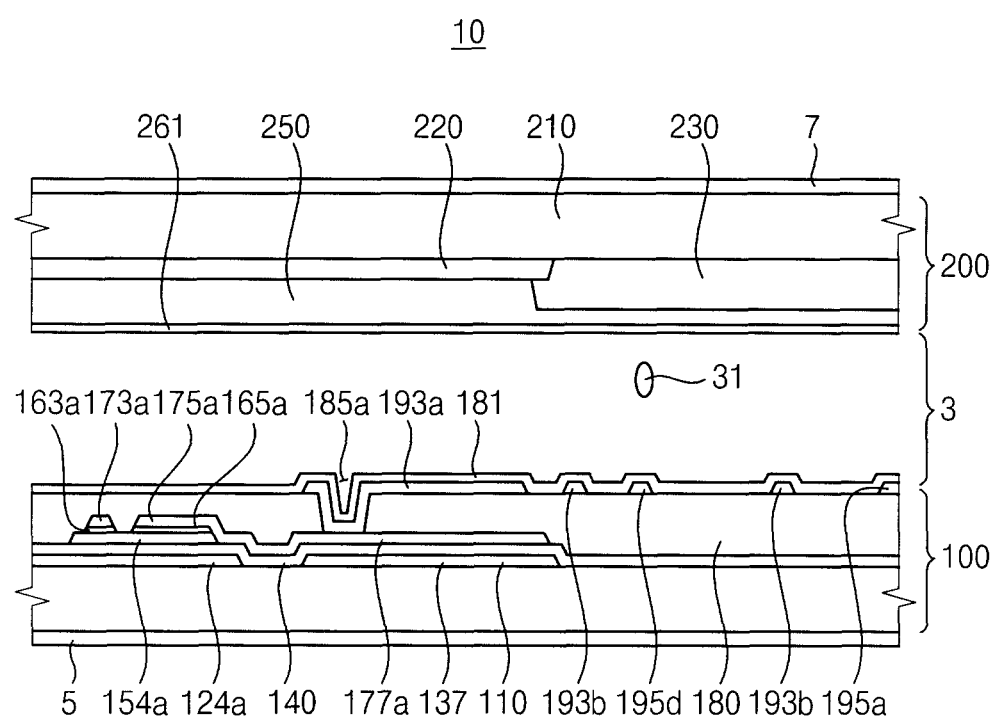
FIG. 2 is a cross-sectional view taken along a line I-I' in FIG. 1.

FIG. 1 is a plan view illustrating a pixel of a display apparatus 10 according to an example embodiment of the present invention. FIG. 2 is a cross-sectional view taken along a line I-I' in FIG. 1.

Referring to FIGS. 1 and 2, the display apparatus 10 according to the present example embodiment includes an array substrate 100, a counter substrate 200 and a liquid crystal layer 3.

In the present example embodiment, the array substrate 100 includes a lower substrate 110, a gate line 121, a storage line 131, a gate insulation layer 140, a semiconductor layer 154a having an island type, resistive contact layers 163a and 165a having an island type, first and second data lines 171a and 171b, a organic insulation layer 180, first and second pixel electrodes 193 and 196, and a lower alignment layer 181.

The array substrate 100 mentioned above is only chosen for explanation. Any array substrate 100 including a micro-slit portion (hereinafter referred to as a slit electrode portion) formed through a pixel electrode may be chosen as an array substrate 100 in the present example embodiment.

For example, gate metal layer is formed on the lower substrate 110 formed of glass or plastic, and the gate metal layer is etched to form a plurality of the gate lines 121 and the storage lines 131. A gate signal is transmitted through the gate line 121, and the gate lines 121 may extend parallel to each other along a second direction P02, for example, a width direction of a unit pixel area.

In the present example embodiment, the unit pixel area extends in a zigzag fashion along a first direction P01 perpendicular to the second direction P02, so that the unit pixel area has a Z-shape. Thus, the unit pixel area is bent twice. For example, the unit pixel area may extend along third and fourth directions D01 and D02. The third and fourth directions D01 and D02 may be perpendicular to each other, and may respectively form an angle of about 45 degrees with the first and second directions P01 and P02. The first and second directions P01 and P02 are respectively parallel to a first polarization axis of a lower polarizing plate 5 and a second polarization axis of an upper polarizing plate 7 mentioned below.

The gate line 121 is formed between the unit pixel areas. First and second gate electrodes protrude from the gate line 121. The first and second gate electrodes 124a and 124b are formed in lower corners of the unit pixel area. The storage line 131 is formed between the gate line 121 and a lower side of the unit pixel area. The gate insulation layer 140 is formed on the gate line 121 and the storage line 131 using silicon nitride (SiNx) or silicon oxide (SiOx).

A semiconductor layer 154a, a resistive contact layer and a source metal layer are successively formed on the gate insulation layer 140, and etched, so that a plurality of the first and second data lines 171a and 171b, the semiconductor layer 154a having the island type, the resistive contact layers 163a and 165a having the island type, and first and second drain electrodes 175a and 175b are formed.

The semiconductor layer 154a and the resistive contact layers 163a and 165a are formed over the first and second gate electrodes 124a and 124b. For example, the semiconductor layer 154a may be formed of amorphous silicon hydride or polysilicon. The resistive contact layer may be formed of silicide or n+ amorphous silicon hydride doped with n-type impurities such as phosphorus at a high density.

The first and second data lines 171a and 171b each transmit a data signal, and extend in the zigzag fashion along the shape of the unit pixel area and the first direction P01. The first and second data lines 171a and 171b respectively extend along left and right sides of the unit pixel area.

The first and second data lines 171a and 171b cross the gate line 121 and the storage line 131. First and second source electrodes 173a and 173b respectively extend from the first and second data lines 171a and 171b. The first and second source electrodes 173a and 173b have a U-shape along the second direction P02.

The first and second drain electrodes 175a and 175b are inserted into the U-shape, and extend to the first and second pixel electrodes 193 and 196.

First and second switching elements TFT1 and TFT2 having three terminals respectively include the first and second gate electrodes 124a and 124b, the gate insulation layer 140, the semiconductor layer 154a, the resistive contact layers 163a and 165a, the first and second source electrodes 173a and 173b and the first and second drain electrodes 175a and 175b.

The organic insulation layer 180 is formed on the first and second data lines 171a and 171b. First and second contact holes 185a and 185b are formed through the organic insulation layer 180 to partially expose the first and second drain electrodes 175a and 175b.

Figure 3:
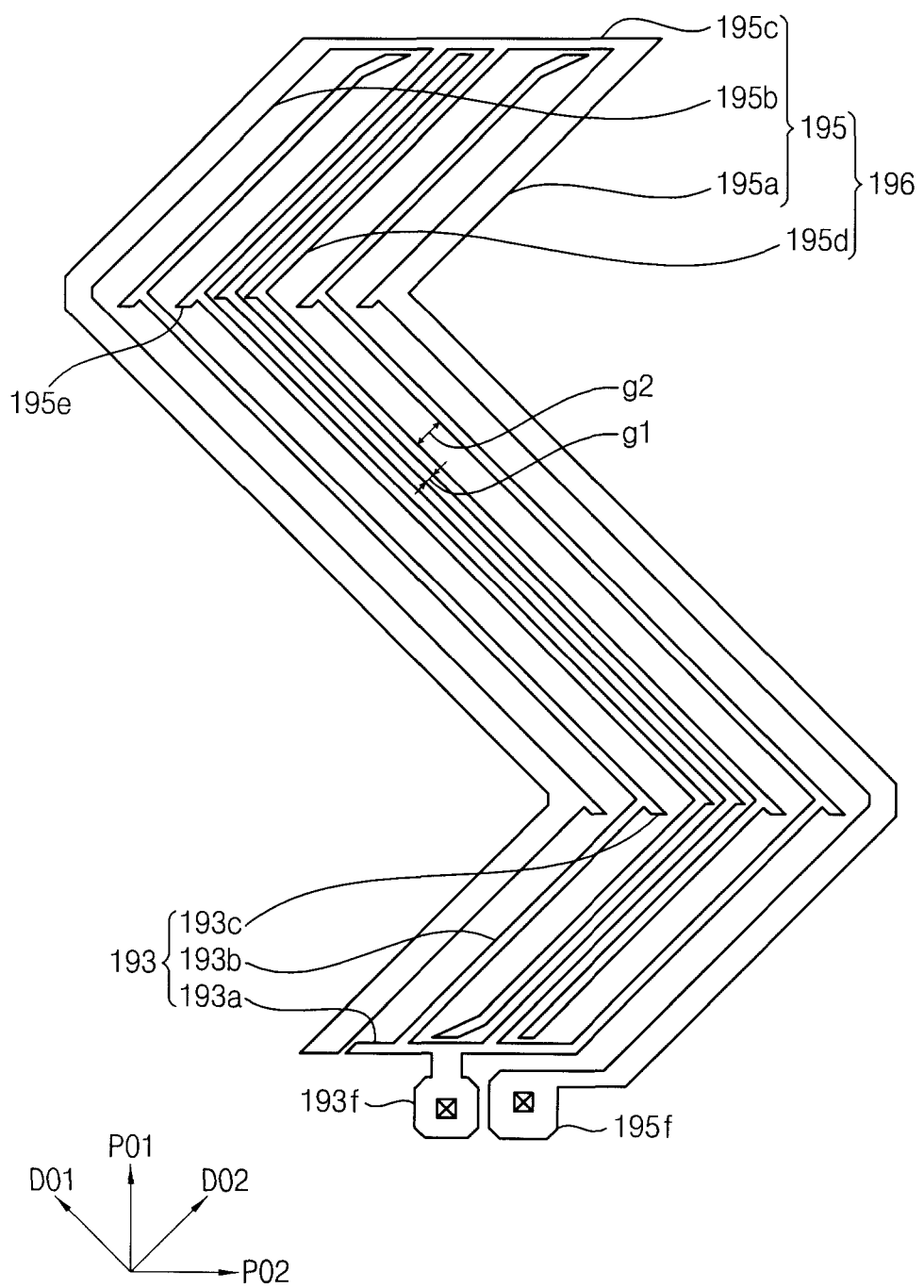
FIG. 3 is a plan view illustrating the pixel electrode in FIG. 1.

FIG. 3 is a plan view illustrating the pixel electrode in FIG. 1.

Referring to FIGS. 1, 2 and 3, a transparent conductive layer is formed on the organic insulation layer 180 using indium tin oxide (ITO) or indium zinc oxide (IZO). The transparent conductive layer is connected to the first and second drain electrodes 175a and 175b through the first and second contact holes 185a and 185b. The transparent conductive layer is patterned to form the first and second pixel electrodes 193 and 196, and the first and second pixel electrodes 193 and 196 form a plurality of domains in the unit pixel area.

The first pixel electrode 193 includes a first supporting electrode portion 193a and a plurality of first slit electrode portions 193b. The first supporting electrode portion 193a extends along the second direction P02 and partially overlaps with the storage electrode 131. A first contact portion 193f extends from the first supporting electrode portion 193a over an end portion of the first drain electrode. The first contact portion 193f is connected with the first drain electrode 175a through the first contact hole 185a. When a gate-on signal is applied to the first gate electrode 124a through the gate line 121, a first pixel voltage is applied to the first pixel electrode 193 through the first data line 171a.

The first pixel electrode 193 includes a plurality of the first slit electrode portions 193b, for example, three first slit electrode portions 193b as illustrated in FIGS. 1 and 3. The first slit electrode portions 193b extend in the zigzag fashion along the shape of the unit pixel area and the first direction P01. Thus, the first slit electrode portion 193b includes first, second and third straight portions which integrally form a Z-shape. The first straight portion extends from the first supporting electrode portion 193a along the fourth direction D02. The second straight portion extends from an end portion of the first supporting electrode portion 193a along the third direction D01. The third straight portion extends from an end portion of the second straight portion along the fourth direction D02 to an upper side of the unit pixel area.

The first pixel electrode 193 further includes a first gap compensating protrusion 193c. The first gap compensating protrusion 193c protrudes substantially parallel to the first slit electrode portion 193b from first bending portions where the first and second straight portions are bent in the zigzag fashion. The first gap compensating protrusion 193c prevents control force for liquid crystal from being decreased due to a gap wider than a predetermined gap between the first slit electrode portion 193b and a second slit electrode portion 195d mentioned below. Thus, the first gap compensating protrusion 193c decreases texture in the unit pixel area.

The second pixel electrode 196 includes a plurality of second supporting electrode portions 195 and a second slit electrode portion 195d. The second supporting electrode portion 195 includes first, second and third outline portions 195a, 195b and 195c. The first and second outline portions 195a and 195b are respectively disposed on the left and right side of the unit pixel area, and extend in the zigzag fashion. The third outline portion 195c is disposed on the upper side of the unit pixel area, and connects the first outline portion 195a with the second outline portion 195b. Two second slit electrode portions 195d extend from the third outline portion 195c in the zigzag fashion, and are disposed between adjacent first slit electrode portions 193b.

A second contact portion 195f extends from a lower end portion of the second outline portion 195b over an end portion of the second drain electrode 175b. The second contact portion 195f is connected with the second drain electrode 175b through the second contact hole 185b. When a gate-on signal is applied to the second gate electrode 124b through the gate line 121, a second pixel voltage is applied to the second pixel electrode 196 through the second data line 171b.

Polarities of the first and second pixel voltages are different from each other. The line structure, such as those of the first and second data lines 171a and 171b, limit the maximum of the first and second pixel voltages. In the present example embodiment, the first and second pixel voltages having different polarities from each other are respectively applied to the first and second pixel electrodes 193 and 196. Therefore, a voltage applied to the liquid crystal layer 3 is higher than the voltage applied to the liquid crystal layer 3 when the polarities of the first and second pixel voltages are the same as each other. Thus, a driving voltage having a high level is applied to the liquid crystal layer 3, and the response time of the liquid crystal 31 may be improved.

The directional axis of the liquid crystal 31, for example, a long axis of the liquid crystal 31 is aligned perpendicular to the first and second slit electrode portions 193b and 195d. Thus, the long axis of the liquid crystal 31 is aligned along four directions, positive and negative third directions D01, and positive and negative fourth directions D02, so that four domains are formed in the unit pixel area.

A gap between the first and second pixel electrodes 193 and 196 varies according to a position in the unit pixel area. In the present example embodiment, a single first slit electrode portion 193b is disposed in the center of the unit pixel area, and extends in the zigzag fashion. Remaining two first slit electrode portions 193b are disposed on both sides of the single first slit electrode portion 193b. Two second slit electrode portions 195d are spaced apart from the single first slit electrode portion 193b by a first gap g1, and from the remaining two first slit electrode portions 193b by a second gap g2 larger than the first gap g1.

When a pixel voltage is constant, the intensity of an electric field generated in the liquid crystal layer 3 may be increased when a gap between slit electrode portions is decreased. Thus, an area in which the first and second slit electrode portions 193b and 195d are spaced apart from each other by the first gap g1 is defined as a high area in which an electric field having relative high level voltage is generated, and an area in which the first and second slit electrode portions 193b and 195d are spaced apart from each other by the second gap g2 is defined as a low area in which has an electric field having relative low level voltage is generated. For example, the first and second gap may be in the range of about 3 µm to about 24 µm. Therefore, four domains mentioned above, the low area and the high area form eight domains.

Referring to FIG. 2, the lower alignment layer 181 is formed on the first and second pixel electrodes 193 and 196. The lower polarizing plate 5 is disposed on a rear surface of the lower substrate 110, and has the first polarization axis parallel to the first direction P01 or the second direction P02.

The counter substrate 200 includes an upper substrate 210, a light-blocking pattern 220, a color filter pattern 230, an overcoat layer 250 and an upper alignment layer 261.

The light-blocking pattern 220 is formed on the upper substrate 210 corresponding to the gate line 121, the first and second data lines 171a and 171b, the first and second switching elements TFT1 and TFT2, and the storage line 131. Thus, the color filter pattern 230 is formed on the upper substrate 210 corresponding to the unit pixel area which is not blocked by the light-blocking pattern 220. For example, the color filter pattern 230 may include red, green, and blue color filters. The red, green, and blue color filters are disposed in the unit pixel area along the first direction P01.

The overcoat layer 250 covers the color filter pattern 230 and the light-blocking pattern 220. The upper alignment layer 261 is formed of the same material as the lower alignment layer 181 on the overcoat layer 250.

In the present example embodiment, the liquid crystal layer 3 includes liquid crystal 31 having a twisted nematic type. The lower and upper alignment layers 181 and 261 do not undergo a rubbing process, but undergo an alignment process, so that the liquid crystal 31 is aligned according to vertical alignment mode.

In the present example embodiment, a horizontal electric field is formed between the first and second pixel electrodes 193 and 196. The counter substrate 200 does not have an electrode forming an electric field generated in the liquid crystal 31.

The upper polarizing plate 7 is disposed on a front surface of the upper substrate 210, and has the second polarization axis substantially perpendicular to the first polarization axis.

Figure 4:
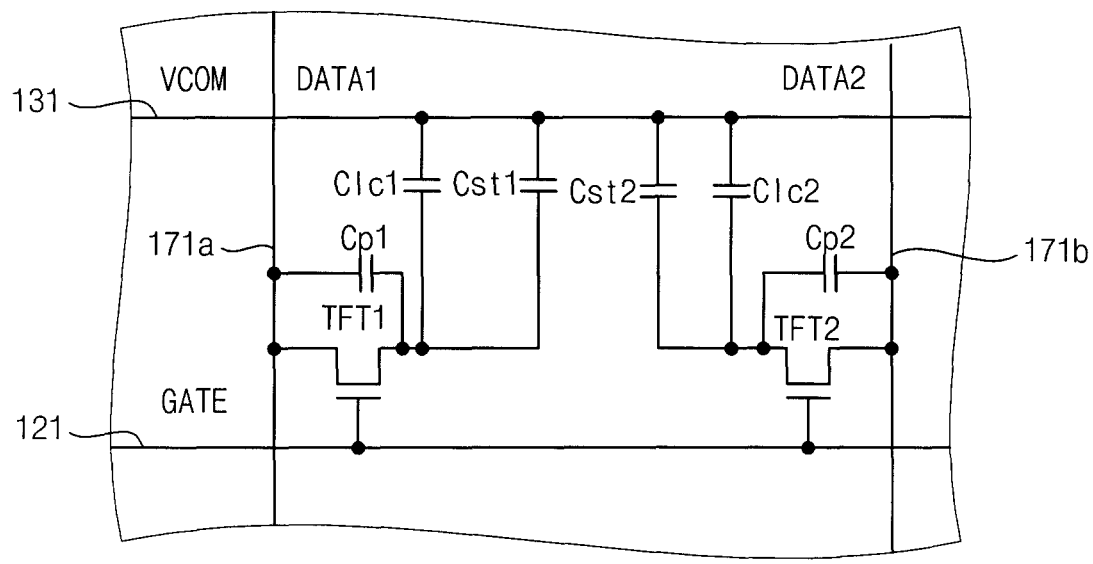
FIG. 4 is an equivalent circuit diagram illustrating the display apparatus in FIG. 2.
Figure 5A:
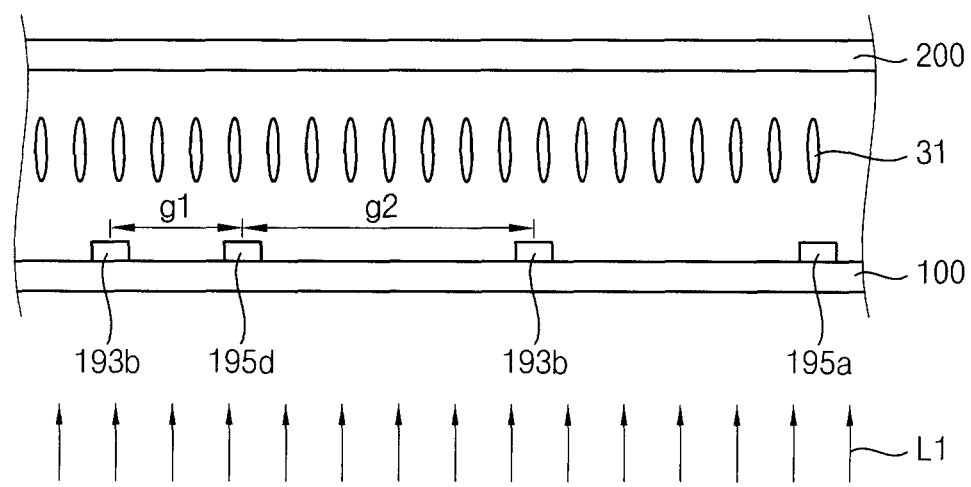
FIGS. 5A and 5B are cross-sectional views illustrating driving modes of the display apparatus in FIG. 2.
Figure 5B:
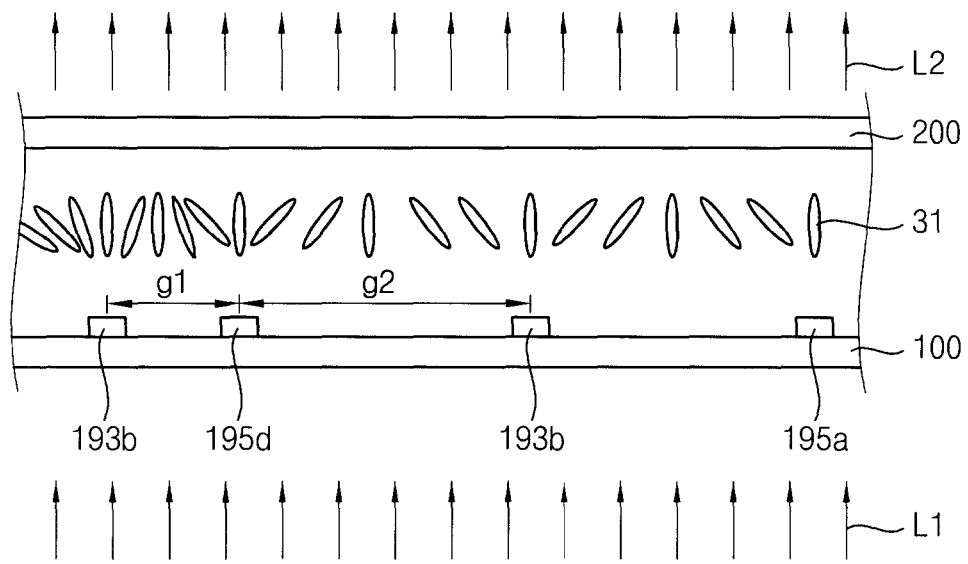

FIG. 4 is an equivalent circuit diagram illustrating the display apparatus 10 in FIG. 2. FIGS. 5A and 5B are cross-sectional views illustrating driving modes of the display apparatus 10 in FIG. 2.

Referring to FIG. 4, the first and second pixel voltages having different polarity are respectively applied to the first and second pixel electrodes 193 and 196 through the first and second switching elements TFT1 and TF2. The first and second pixel voltages may be held for a single frame by first and second storage capacities Cst1 and Cst2. The first and second storage capacities Cst1 and Cst2 are respectively formed between the storage line 131 and the first pixel electrode 193, and the storage line 131 and the second pixel electrode 196. First and second parasitic capacities Cp1 and Cp2 may be formed between the first and second data lines 171a and 171b, and the first and second pixel electrodes 193 and 196.

Referring to FIG. 5A, when the display apparatus 10 is driven in an off-mode in which a pixel voltage is not applied to the first and second pixel electrodes 193 and 196, the long axis of the liquid crystal 31 is aligned along a vertical direction perpendicular to the array substrate 100. Thus, a backlight L1 incident on a rear surface of the array substrate 100 is blocked through an orthogonal polarization of the lower and upper polarizing plates 5 and 7, so that the display apparatus 10 displays a black mode.

Referring to FIG. 5B, when the display apparatus 10 is driven in an on-mode in which the first and second pixel voltages are respectively applied to the first and second pixel electrodes 193 and 196, the horizontal electric field mentioned above is formed between the first and second pixel electrodes 193 and 196. The liquid crystal 31 has a positive type, so that the long axis of the liquid crystal 31 is aligned substantially parallel to the electric field. The liquid crystal 31 is inclined along the electric field, and inclinations of the liquid crystals 31 in the high area and the low area are different from each other.

Figure 6:
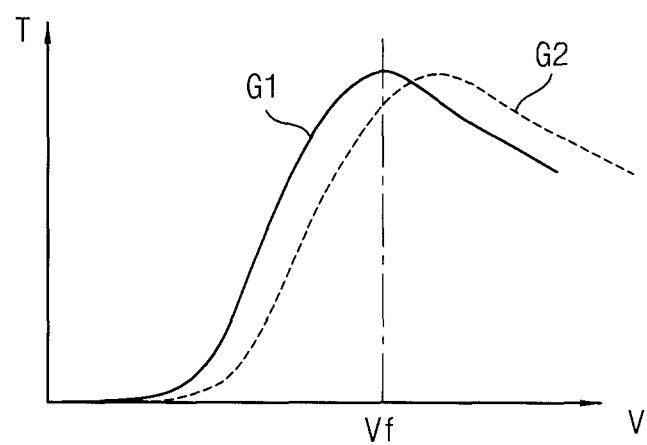
FIG. 6 is a voltage-transmittance graph in low and high areas.

FIG. 6 is a voltage-transmittance graph in the low and high areas.

Referring to FIG. 6, a horizontal axis indicates a voltage applied to the liquid crystal layer 3, and a vertical axis indicates a transmittance of the display apparatus 10. When the first and second pixel voltages have substantially the same absolute value, first and second voltage-transmittance graphs G1 and G2 respectively corresponding to the high and low areas are different from each other. In a low gray scale, luminance of the unit pixel area is almost obtained from the high area, while in a middle or a high gray scale, luminance of the unit pixel area is obtained not only from the high area but from the low area.

The backlight L1 incident on the rear surface of the array substrate 100 is polarized by the lower polarizing plate 5, and undergoes double refraction through the liquid crystals 31, so that the polarization state of light is changed and the light L2 passes through the upper polarizing plate 7. Therefore, the display apparatus 10 displays a white mode.

In the present example embodiment, as mentioned above, the first and second pixel voltages having different polarities from each other are respectively applied to the first and second pixel electrodes 193 and 196. Thus, the driving voltage having a high level may be applied to the liquid crystal layer 3, so that textures may be decreased in side of the unit pixel area. In addition, the low and high areas are formed according to a gap between the first and second slit electrode portions 193b and 195d, so that the number of the domains is changed from 4 to 8. Thus, side visibility of the display apparatus 10 may be significantly improved.

To improve the side visibility, it is important to adjust an area ratio of the low and high areas according to display properties of the display apparatus 10. In the present example embodiment, a gap between the first and second slit electrode portions 193b and 195d may be easily changed in a manufacturing process for the array substrate 100, so that the area ratio of the low and high area may be easily changed as occasion demands. In addition, the first and second slit electrode portions 193b and 195d are disposed to form an angle of about 45 degrees with the first and second polarization axis anywhere in the unit pixel area, so that textures may be decreased in the side of the unit pixel area.

Figure 7:
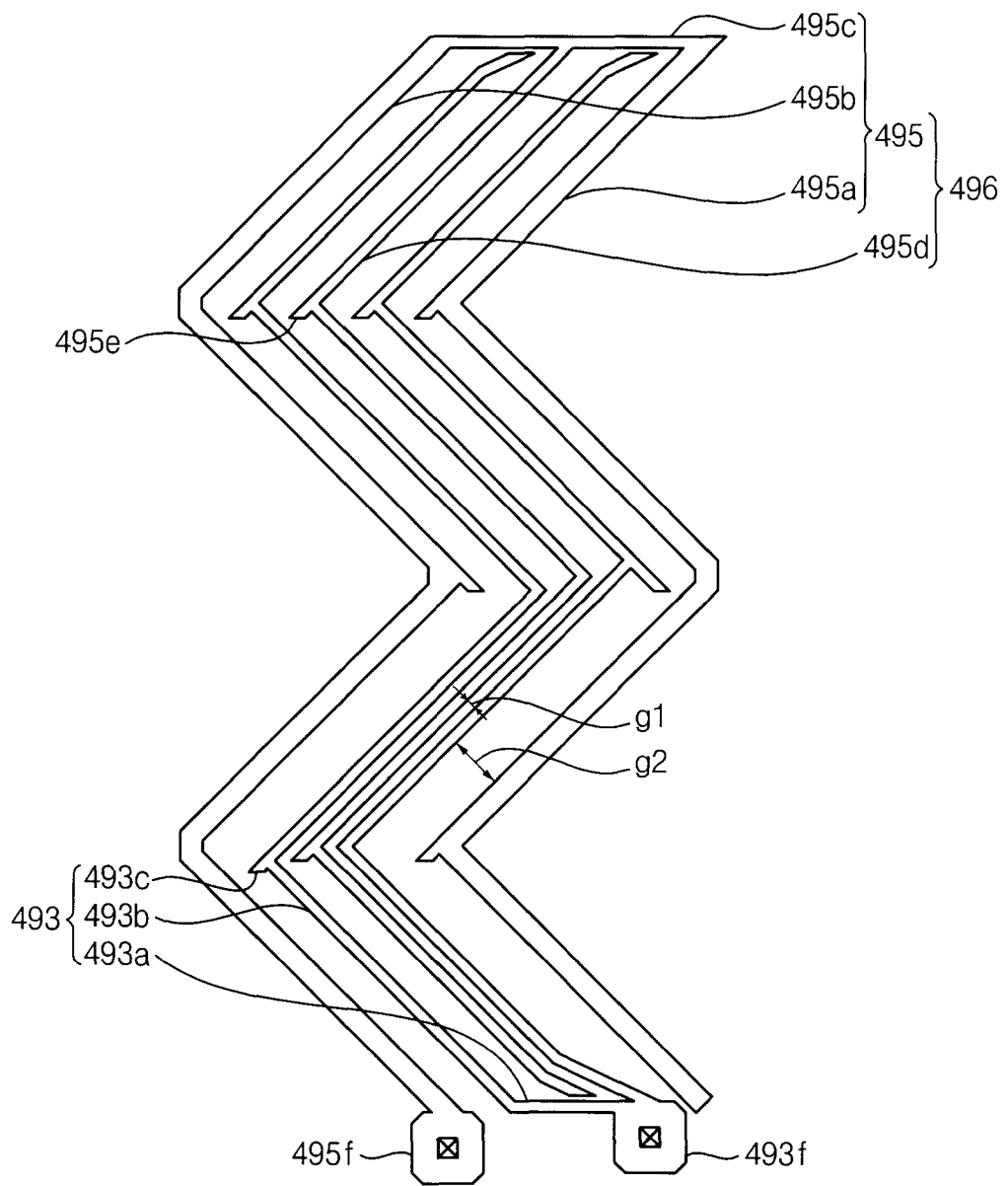
FIG. 7 is a plan view illustrating a pixel electrode of an array substrate according to another example embodiment of the present invention.

FIG. 7 is a plan view illustrating a pixel electrode of an array substrate according to another example embodiment of the present invention.

Referring to FIG. 7, the array substrate according to the present example embodiment is substantially the same as the array substrate 100 illustrated in FIGS. 1 to 6, except that a unit pixel area, first and second slit electrode portions 493b and 495d have a W-shape, and the numbers of the first and second slit electrode portions 493b and 495d are different from the previous example embodiment illustrated in FIGS. 1 to 6. Thus, further descriptions of the array substrate according to the present example embodiment will be omitted.

In the present example embodiment, a first pixel electrode 493 includes a first supporting electrode portion 493a and a plurality of first slit electrode portions. Two first slit electrode portions 493b extend from the first supporting electrode portion 493a in the zigzag fashion along the shape of the unit pixel area and the first direction P01, so that the first slit electrode portions 493b have the W-shape.

A second pixel electrode 496 includes a second supporting electrode portion 495 and a second slit electrode portion 495d. A single second slit electrode portion 495d extends from a third outline portion 495c of the second supporting electrode portion 495 in the zigzag fashion along the shape of the unit pixel area and the first direction P01, and is disposed between adjacent first slit electrode portions 493b.

The first and second slit electrode portions 493b and 495d are spaced apart from each other by a first gap g1, so that an area having the first gap g1 is defined as a high area. The first slit electrode is spaced apart from first and second outlines portions of the second supporting portion by a second gap g2 wider than the first gap g1, so that an area having the second gap g2 is defined as a low area. Thus, the first and second slit electrodes, and the low and high area together form 8 domains in the unit pixel area.

A display apparatus according to the present example embodiment is substantially the same as the display apparatus 10 illustrated in FIGS. 1 to 6, except for including the array substrate illustrated in FIG. 7. Thus, further descriptions of the display apparatus according to the present example embodiment will be omitted.

Figure 8:
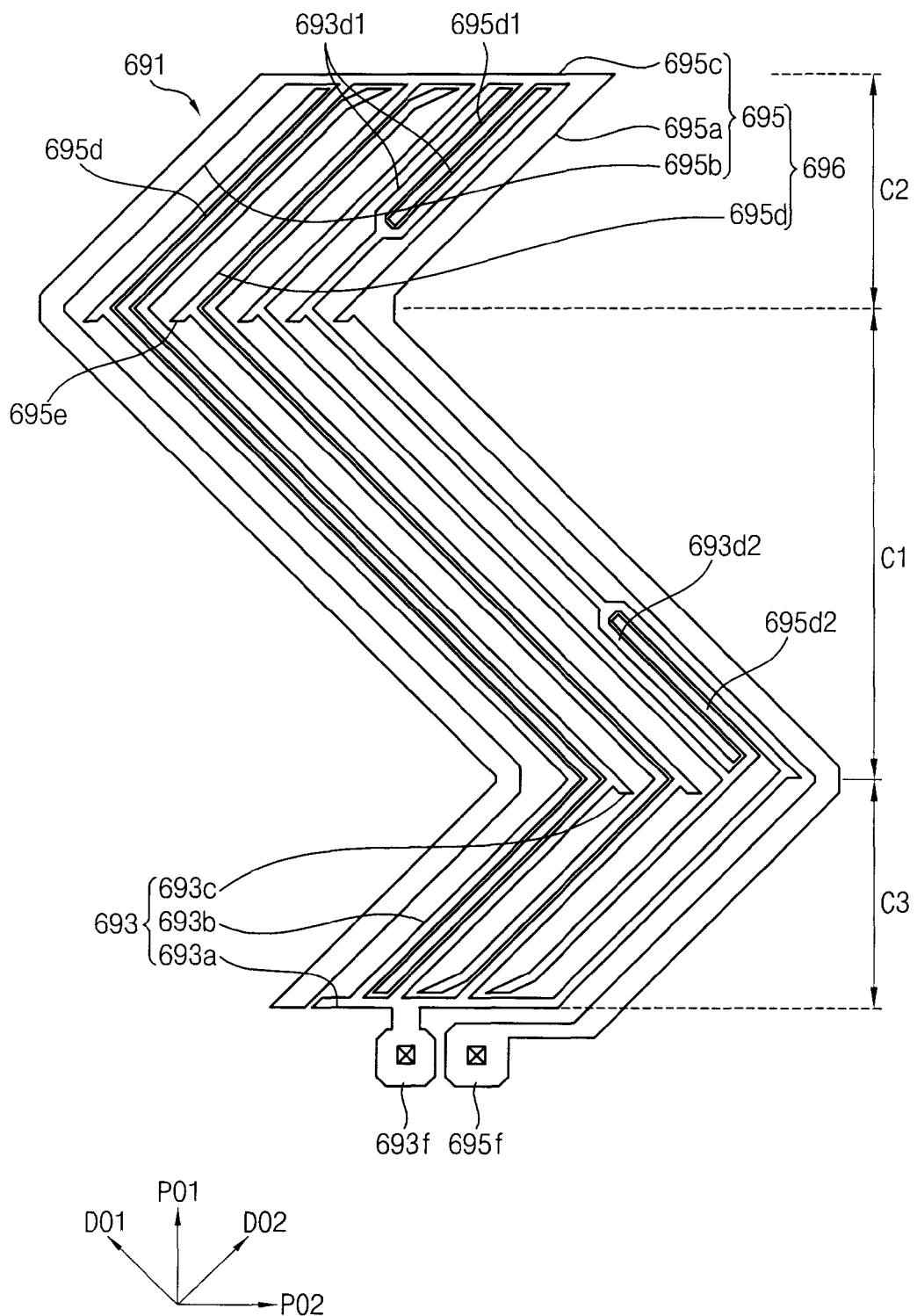
FIG. 8 is a plan view illustrating a pixel electrode of an array substrate according to still another example embodiment of the present invention.
Figure 9:
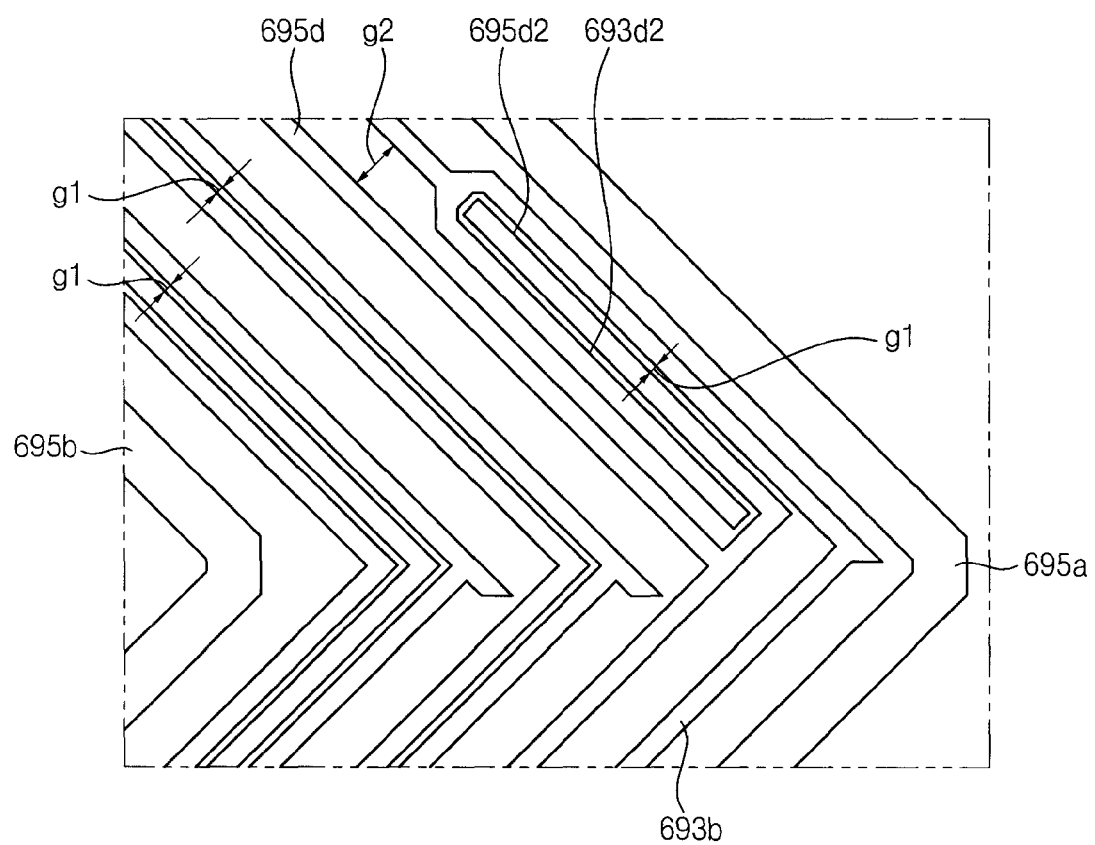
FIG. 9 is an enlarged view illustrating the pixel electrode in FIG. 8.

FIG. 8 is a plan view illustrating a pixel electrode of an array substrate according to still another example embodiment of the present invention. FIG. 9 is an enlarged view illustrating the pixel electrode in FIG. 8.

Referring to FIGS. 8 and 9, the array substrate according to the present example embodiment is substantially the same as the array substrate 100 illustrated in FIGS. 1 to 6, except that first and second slit electrode portions 693b and 695d are divided into a plurality of branches to form a high area, and the numbers and gaps of the first and second slit electrode portions 693b and 695d are different from the previous example embodiment illustrated in FIGS. 1 to 6. Thus, further descriptions of the array substrate according to the present example embodiment will be omitted.

In the present example embodiment, a first pixel electrode 693 includes a first supporting electrode portion 693a and four first slit electrode portions. The first slit electrode portions 693b extend from the first supporting electrode portion 693a in the zigzag fashion along the first direction P01, so that the first slit electrode portions 693b have a Z-shape. The first slit electrode portion 693b includes first, second, and third straight portions that integrally form the Z-shape. Two first slit electrode portions 693b are spaced apart from each other by a small gap, and the remaining two first slit electrode portions 693b are spaced apart from each other by a large gap wider than the small gap.

A second pixel electrode 696 includes a second supporting electrode portion 695 and a second slit electrode portion 695d. Three second slit electrode portions 695d extend from a third outline portion 695c of the second supporting electrode portion 695 in the zigzag fashion along the first direction P01, and are disposed between adjacent first slit electrode portions 693b, so that the second slit electrode has the Z-shape.

The second slit electrode portion 695d is spaced apart from the first slit electrode portions which are spaced apart from each other by a first gap g1 to form a high area. The second slit electrode portion 695d is spaced apart from the first slit electrode portions which are spaced apart from each other by a second gap g2 wider than the first gap g1 to form a low area.

The first slit electrode portion 693b includes a third straight portion. An end portion of the third straight portion is divided into two first branch electrode portions. A fourth branch electrode portion extends substantially parallel to the first slit electrode portion 693b from the third outline portion 695c in the low area, and is disposed between adjacent two first branch electrode portions. A lower end portion of the second straight portion is divided into two second branch electrode portions, and one of the two second branch electrode portions is connected with a first straight portion. A third branch electrode portion extends from the second slit electrode portion 695d, and is disposed between adjacent two second branch electrode portions. The first and fourth branch electrode portions, and the second and third branch electrode portions are spaced apart from each other by the first gap g1 to form the high area.

Figure 10A:
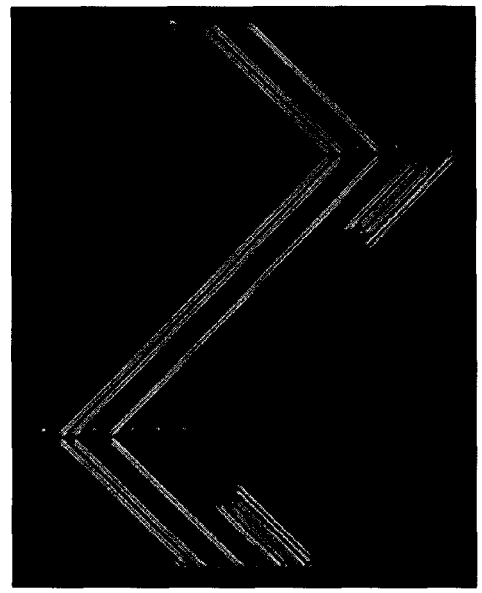
FIGS. 10A and 10B are pictures showing a pixel according to driving modes of a display apparatus including the pixel electrode in FIG. 8.
Figure 10B:
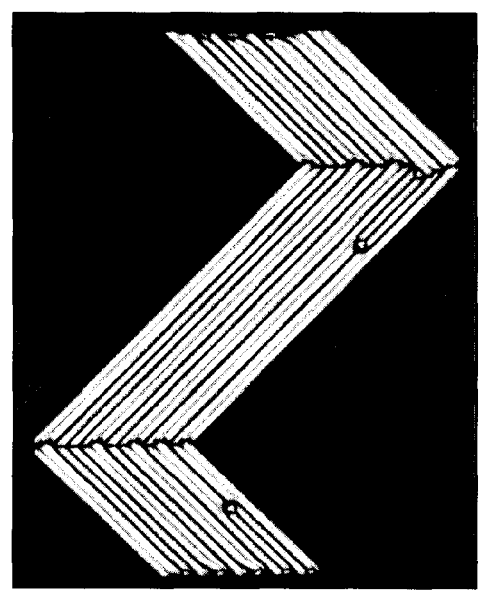

FIGS. 10A and 10B are pictures showing a pixel according to driving modes of a display apparatus including the pixel electrode in FIG. 8.

Referring to FIG. 10A, as mentioned in FIGS. 5A and 5B, when first and second pixel voltages having opposite polarities and the same level are respectively applied to the first and second pixel electrodes 693 and 696, transmittances in the low and high areas are different from each other. The picture in FIG. 10A shows luminance of the pixel on a low gray scale. Referring to FIG. 10A, a pixel is driven by the white mode only in the high area on the low gray scale. The picture in FIG. 10B shows luminance of the pixel area on a middle or high gray scale. Referring to FIG. 10B, the pixel is driven by the white mode in the high and low areas on the middle or high gray scale.

In the present example embodiment, not only the gap between the first and second slit electrode portions 693b and 695d, but also length of the first, second, third and fourth branch electrode portions are changed according to display properties of the display apparatus, so that the area ratio of the low and high area may be easily changed as occasion demands. Thus, side visibility may be significantly improved due to high-low driving of the first and second electrodes mention above.

A display apparatus according to the present example embodiment is substantially the same as the display apparatus 10 illustrated in FIGS. 1 to 6, except for including the array substrate illustrated in FIGS. 8 to 10b. Thus, further descriptions of the display apparatus according to the present example embodiment will be omitted.

Figure 11:
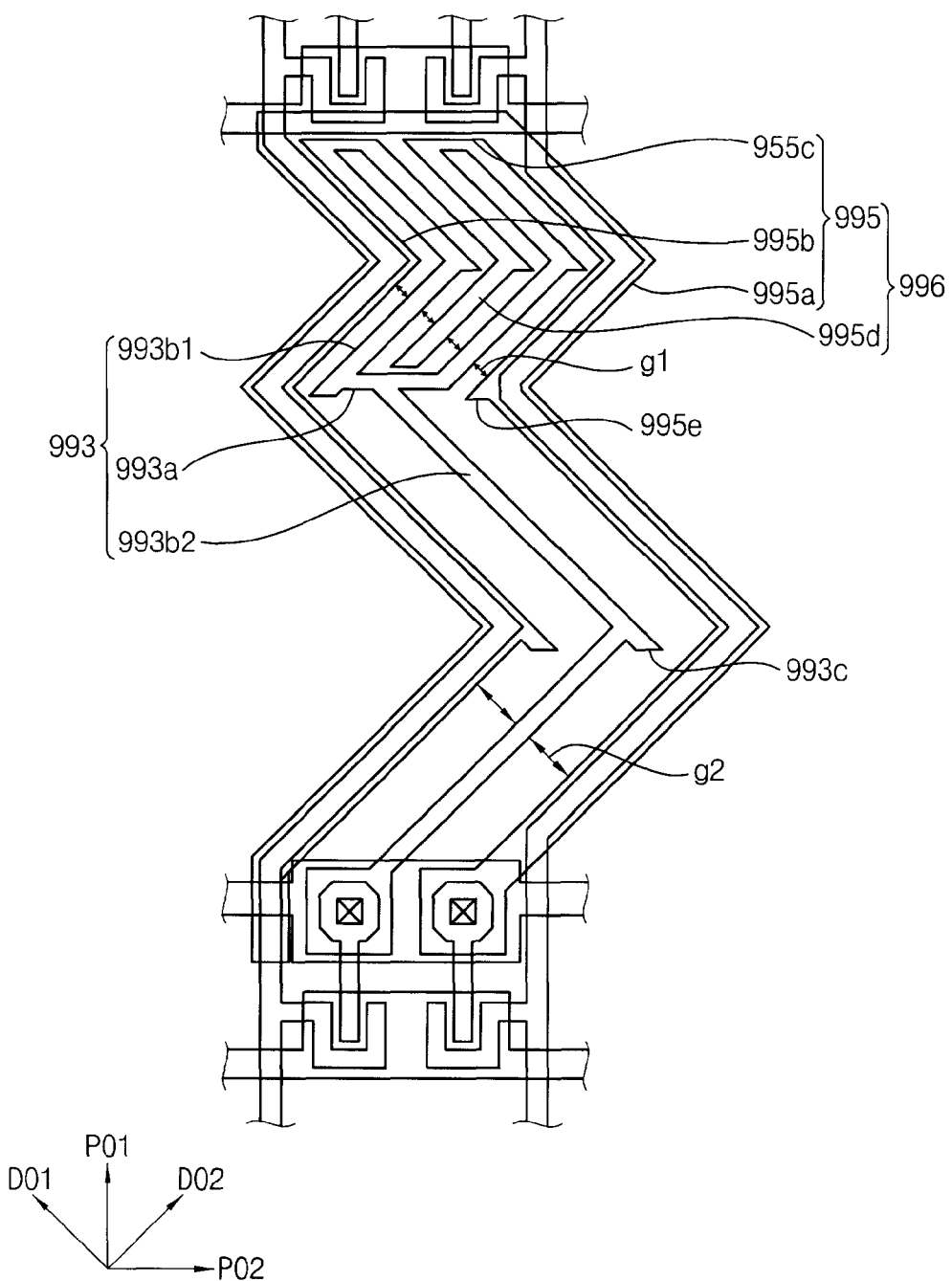
FIG. 11 is a plan view illustrating a pixel of an array substrate according to still another example embodiment of the present invention.
Figure 12:
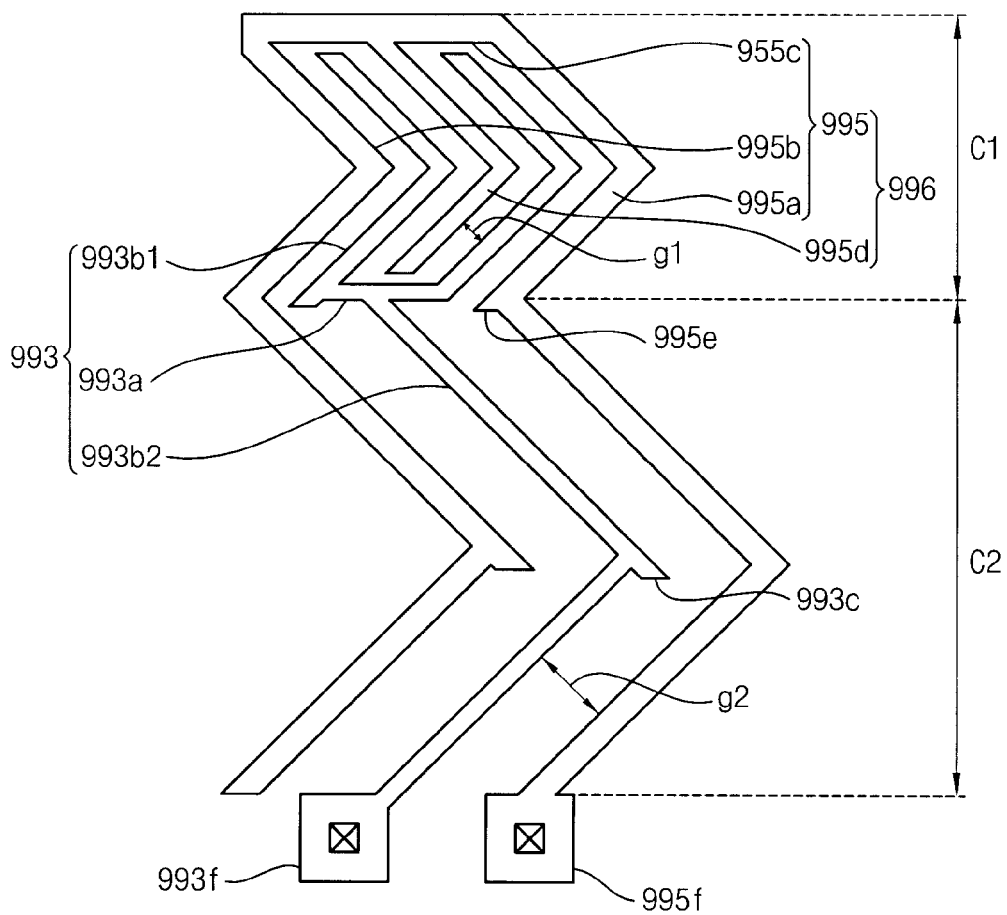
FIG. 12 is a plan view illustrating a pixel electrode in FIG. 11.

FIG. 11 is a plan view illustrating a pixel of an array substrate 900 according to still another example embodiment of the present invention. FIG. 12 is a plan view illustrating a pixel electrode in FIG. 11.

Referring to FIGS. 11 and 12, the array substrate 900 according to the present example embodiment is substantially the same as the array substrate 100 illustrated in FIGS. 1 to 6, except for shapes of a unit pixel area, the first and second pixel electrodes 993 and 996. Thus, further descriptions of the array substrate according to the present example embodiment will be omitted.

In the present example embodiment, the unit pixel area is divided into upper and lower V-cells C1 and C2 having a V-shape. The upper and lower V-cells are connected with each other to form a W-shape. Thus, the unit pixel area extends in a zigzag fashion along the first direction P01 to have the W-shape.

In the present example embodiment, the upper V-cell C1 is shorter than the lower V-cell C2 along the first direction P01 as illustrated in FIGS. 11 and 12. A first supporting electrode portion 993a extends along the second direction P02 in a boundary between the upper and lower V-cells C1 and C2. The numbers of the first slit electrode portions 993b1 and 993b2 in the upper and lower V-cells C1 and C2 are different from each other. For example, two first slit electrode portions 993b1 having a V-shape are disposed in the upper V-cell C1, and a single first slit electrode portion 993b2 having a V-shape is disposed in the lower V-cell C2. A second slit electrode portion 995d of the second pixel electrode 996 extends from a third outline portion 995c of a second supporting electrode portion 995, and is disposed between the first slit electrode portions 993b1 in the upper V-cell C1.

The first and second slit electrode portions 993b and 995d in the upper V-cell C1 are spaced apart from each other by a first gap g1 to form a high area. The first slit electrode portion 993b2 and the second supporting electrode portion 995 in the lower V-cell C2 are spaced apart from each other by a second gap g2 to form a low area.

The first and second slit electrode portions 993b and 995d, the second supporting electrode portion 995, and the low and high areas together form 8 domains in the unit pixel areas. In the present example embodiment, the area ratio of the low and high areas is adjusted to obtain a predetermined area ratio by changing areas of the upper and lower V-cells C1 and C2, which is different from dividing slit electrode portions into branch electrodes. For example, the area ratio is changed by changing the length of the upper and lower V-cells C1 and C2 along the first direction P01. Thus, changing the area ratio may be easily performed according to display properties of the display apparatus.

A display apparatus according to the present example embodiment is substantially the same as the display apparatus 10 illustrated in FIGS. 1 to 6, except for including the array substrate 900 illustrated in FIGS. 11 and 12. Thus, further descriptions of the display apparatus according to the present example embodiment will be omitted.

Figure 13:
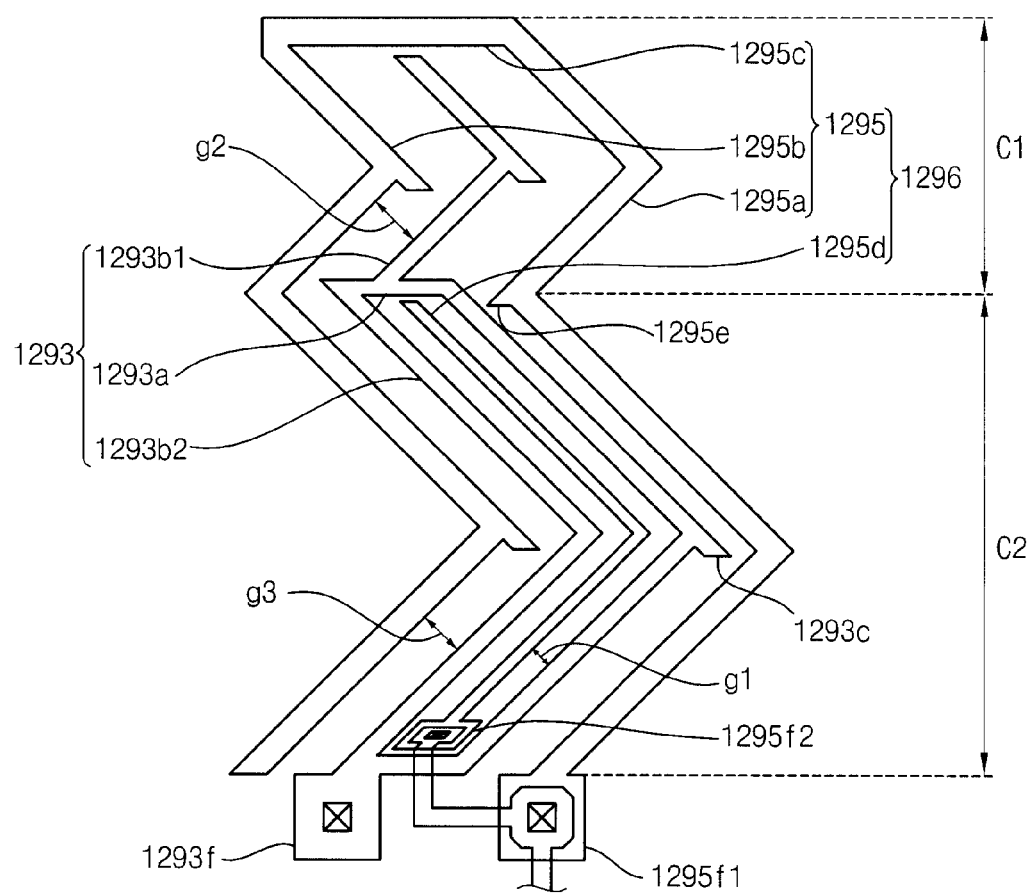
FIG. 13 is a plan view illustrating a pixel electrode of an array substrate according to still another example embodiment of the present invention.

FIG. 13 is a plan view illustrating a pixel electrode of an array substrate according to still another example embodiment of the present invention.

Referring to FIG. 13, the array substrate according to the present example embodiment is substantially the same as the array substrate 900 illustrated in FIGS. 11 and 12, except that the number of a first slit electrode in a lower V-cell C2 is larger than that of the first slit electrode in an upper V-cell C1, and the first and second pixel electrodes 1293 and 1296 are spaced apart from each other by three kinds of gaps. Thus, further descriptions of the array substrate according to the present example embodiment will be omitted.

In the present example embodiment, a first supporting electrode portion 1293a of the first pixel electrode 1293 extends along the second direction P02 in a boundary between the upper and lower V-cells C1 and C2. Two first slit electrode portions 1293b2 having a V-shape are disposed in the lower V-cell C2, and a single first slit electrode portion 1293b1 having a V-shape is disposed in the upper V-cell C1. A second slit electrode portion 1295d of the second pixel electrode 1296 is disposed between the first slit electrode portions 1293b2 in the lower V-cell C2. The first and second slit electrode portions 1293b1, 1293b2, and 1295d are spaced apart from each other by a first gap g1 to form a high area.

The first slit electrode portion 1293b2 in the lower V-cell C2 is spaced apart from the second slit electrode portion 1295d by a first gap g1 to form a high area, and spaced apart from first and second outline portions 1295a and 1295b of the second pixel electrode 1296 by a third gap g3 wider than the first gap g1 to form a middle area. The first slit electrode portion 1293a in the upper V-cell C1 is spaced apart from the first and second outline portions 1295a and 1295b of the second pixel electrode 1296 by a second gap g2 wider than the first and third gaps g1 and g3 to form a low area.

A display apparatus according to the present example embodiment is substantially the same as the display apparatus 10 illustrated in FIGS. 1 to 6, except for including the array substrate illustrated in FIG. 13. Thus, further descriptions of the display apparatus according to the present example embodiment will be omitted.

According to the present invention, a gap between the first and second slit electrode portions, and lengths of the first and second slit electrode portions may be easily changed as occasion demands, so that an area ratio of low and high areas may be easily changed to form a multi-domain structure. In addition, the response time of the display apparatus may be improved, and textures may be decreased in the unit pixel area, so that display quality may be improved. Thus, the present invention is applied to a display apparatus for improving display quality.

The foregoing is illustrative and is not to be construed as limiting of the teachings provided herein. Although a few example embodiments have been described, those skilled in the art will readily appreciate that many modifications are possible in the example embodiments without materially departing from the novel teachings and advantages of the present disclosure. Accordingly, all such modifications are intended to be included within the scope of the present teachings. In the below claims, means-plus-function clauses are intended to cover the structures described herein as performing the recited function and not only structural equivalents but also functionally equivalent structures. Therefore, it is to be understood that the foregoing is illustrative and is not to be construed as limited to the specific example embodiments disclosed, and that modifications to the disclosed example embodiments, as well as other example embodiments, are intended to be included within the scope of the teachings.

What is claimed is:

1. An array substrate comprising:
   a first pixel electrode including a plurality of first slit electrode portions and a first supporting electrode portion, the first slit electrode portions extending in a zigzag fashion along a shape of a unit pixel area in a first direction, the first supporting electrode portion being connected with the first slit electrode portions; and
   a second pixel electrode including a plurality of second slit electrode portions and a second supporting electrode portion, and forming a horizontal electric field with the first pixel electrode, the second slit electrode portions extending in the zigzag fashion along the shape of the unit pixel area in the first direction, each of the second slit electrode portions being disposed between adjacent first slit electrode portions, the second supporting electrode portion being connected with the second slit electrode portions,
   wherein the first and second pixel electrodes respectively further comprise first and second gap compensating protrusions, and the first and second gap compensating protrusions protrude substantially parallel to the first and second slit electrode portions from bending portions in which the first and second slit electrode portions are bent in the zigzag fashion.

2. The array substrate of claim 1, further comprising:
   a first data line;
   a second data line facing the first data line;
   a gate line insulated from and crossing the first and second data lines;
   a first switching element electrically connecting the first data line and the gate line with the first pixel electrode; and
   a second switching element electrically connecting the second data line and the gate line with the second pixel electrode.

3. The array substrate of claim 2, wherein the unit pixel area is divided into high and low areas which are alternatively disposed with each other, the first and second slit electrode portions are spaced apart from each other by a first gap to form the high area, and the first and second slit electrode portions are spaced apart from each other by a second gap wider than the first gap to form the low area.

4. The array substrate of claim 3, wherein the unit pixel area has a Z-shape extending in the zigzag fashion along the first direction.

5. The array substrate of claim 4, wherein the first pixel electrode further comprises at least one first branch electrode portion which extends substantially parallel to the first slit electrode portion from the first slit electrode portion of the low area, the second pixel electrode further comprises a second branch electrode portion which extends from the second slit electrode portion or the second supporting electrode portion, and the second branch electrode portion extends by the first gap between the first branch electrode portion and the first slit electrode portion or between the first branch electrode portions.

6. The array substrate of claim 3, wherein the unit pixel area is divided into upper and lower V-cells having a V-shape and the upper and lower V-cells are connected with each other to form a W-shape.

7. The array substrate of claim 6, wherein the upper and lower V-cells have substantially the same size.

8. The array substrate of claim 6, wherein the upper and lower V-cells have different sizes from each other.

9. The array substrate of claim 6, wherein the first supporting electrode portion is disposed in a boundary between the upper and lower V-cells, and the second slit electrode portion extends from one of the upper and lower V-cells having larger number of the first slit electrode portions to a portion between the first slit electrode portions.

10. The array substrate of claim 9, wherein the first slit electrode portion in the V-cell having larger number of the first slit electrode portions is spaced apart from the second slit electrode portion and the second supporting electrode portion by a third gap wider than the first gap to form a middle area, and the first slit electrode portion in the V-cell having smaller number of the first slit electrode portions is spaced apart from the second supporting electrode portion by a second gap wider than the third gap to form the low area.

11. A display apparatus comprising:
   an array substrate including:
      a first pixel electrode electrically connected with a first switching element and including a plurality of first slit electrode portions and a first supporting electrode portion, the first slit electrode portions extending in a zigzag fashion along a shape of a unit pixel area and a first direction, the first supporting electrode portion being connected with the first slit electrode portions; and
      a second pixel electrode electrically connected with a second switching element and including a plurality of second slit electrode portions and a second supporting electrode portion, the second slit electrode portions extending in the zigzag fashion along the shape of the unit pixel area and a first direction, each of the second slit electrode portions being disposed between adjacent first slit electrode portions, the second supporting electrode portion being connected with the second slit electrode portions;
   a counter substrate facing the array substrate; and
   a liquid crystal layer disposed between the array substrate and the counter substrate, and vertically aligned with respect to the array and counter substrates in an electric field off-mode,
      wherein the first and second pixel electrodes respectively further comprise first and second gap compensating protrusions, and the first and second gap compensating protrusions protrude substantially parallel to the first and second slit electrode portions from bending portions in which the first and second slit electrode portions are bent in the zigzag fashion.

12. The display apparatus of claim 11, further comprising:

a lower polarizing plate disposed on a rear surface of the array substrate, and having a first polarization axis substantially parallel to or substantially perpendicular to the first direction; and an upper polarizing plate disposed on an upper surface of the counter substrate, and having a second polarization axis substantially perpendicular to the first polarization axis.

13. The display apparatus of claim 12, wherein the unit pixel area is divided into high and low areas which are alternatively disposed with each other, the first and second slit electrode portions are spaced apart from each other by a first gap to form the high area, and the first and second slit electrode portions are spaced apart from each other by a second gap wider than the first gap to form the low area.

14. The display apparatus of claim 13, wherein the first pixel electrode further comprises at least one first branch electrode portion which extends substantially parallel to the first slit electrode portion from the first slit electrode portion of the low area, the second pixel electrode further comprises a second branch electrode portion which extends from the second slit electrode portion or the second supporting electrode portion, and the second branch electrode portion extends by the first gap between the first branch electrode portion and the first slit electrode portion or between the first branch electrode portions.

15. The display apparatus of claim 13, the unit pixel area has a Z-shape extending in the zigzag fashion along the first direction.

16. The array substrate of claim 13, wherein the unit pixel area is divided into upper and lower V-cells having a V-shape and the upper and lower V-cells are connected with each other to form a W-shape.

17. The display apparatus of claim 16, wherein the first supporting electrode portion is disposed in a boundary between the upper and lower V-cells, and the second slit electrode portion extends from one of the upper and lower V-cells having larger number of the first slit electrode portions to a portion between the first slit electrode portions.

18. The display apparatus of claim 17, wherein the first slit electrode portion in the V-cell having larger number of the first slit electrode portions is spaced apart from the second slit electrode portion and the second supporting electrode portion by a third gap wider than the first gap to form a middle area, and the first slit electrode portion in a the V-cell having smaller number of the first slit electrode portions is spaced apart by a second gap wider than the third gap from the second supporting electrode portion to form the low area.

* * * * *